United States Patent [19]

Beattie et al.

[11] Patent Number: 4,591,631

[45] Date of Patent: May 27, 1986

[54] SEPARATION OF GUAYULE RUBBER/RESIN EXTRACT FROM GUAYULE BAGASSE BY WATER ADDITION POST-EXTRACTION

[75] Inventors: Joanne L. Beattie, Uniontown; William M. Cole, Norton, both of Ohio

[73] Assignee: The Firestone Tire & Rubber Company, Akron, Ohio

[21] Appl. No.: 650,150

[22] Filed: Sep. 13, 1984

[51] Int. Cl.$^4$ ................................................ C08C 1/04
[52] U.S. Cl. .................................... 528/930; 528/493; 528/494; 528/498
[58] Field of Search ......................................... 528/930

[56] References Cited

U.S. PATENT DOCUMENTS

| | | | |
|---|---|---|---|
| 2,390,860 | 12/1945 | Williams | 260/817 |
| 2,549,763 | 4/1951 | Banigan et al. | 260/501 |
| 2,572,046 | 10/1951 | Meeks et al. | 260/476 |
| 2,618,670 | 11/1952 | Clark | 260/818 |
| 4,136,131 | 1/1979 | Buchanan . | |
| 4,405,532 | 9/1983 | Gutierrez et al. . | |
| 4,435,337 | 3/1984 | Kay et al. | 528/494 X |

FOREIGN PATENT DOCUMENTS

| | | | |
|---|---|---|---|
| 0039910 | 11/1981 | European Pat. Off. | 528/930 |
| 10715 | of 1896 | United Kingdom | 528/930 |

Primary Examiner—Paul R. Michl
Attorney, Agent, or Firm—Daniel N. Hall

[57] ABSTRACT

A method for separating guayule bagasse from a guayule-solvent mixture utilizing a monophase solvent. Upon the addition of water, a two-phase system is formed wherein the bagasse is located just below the monophase solvent-water interface.

17 Claims, No Drawings

SEPARATION OF GUAYULE RUBBER/RESIN EXTRACT FROM GUAYULE BAGASSE BY WATER ADDITION POST-EXTRACTION

TECHNICAL FIELD

The present invention relates to a method for separating guayule shrub bagasse extract after solvent extraction of rubber and resin by the addition of water.

BACKGROUND ART

Heretofore separation of guayule bagasse from solvent solutions was generally done either by expression or filtration. Such methods required a solvent rinse to completely recover the miscella.

U.S. Pat. No. 2,390,860 relates to the purification of plant rubbers such as guayule by utilizing a solvent mixture always containing 50 percent or more of a resin solvent and 50 percent or less of a rubber solvent. Such a method generally forms a two-phase system and results in extraction of guayule resin.

U.S. Pat. No. 2,549,763 relates to the recovery of betaine from guayule plant extract by utilizing a polar solvent, obtaining a phase separation, and then adding a phosphate compound to the aqueous phase.

U.S. Pat. No. 2,618,670 relates to a process for deresinating rubber from plants by utilizing water-miscible resin solvents such as methyl ethyl ketone. Additionally, a methyl ethyl ketone-water azeotrope is utilized.

U.S. Pat. No. 2,572,046 relates to using a water miscible solvent to form a solution of the guayule utilizing the resin phase and adding a hydrocarbon such as pentane solvent thereto to form a two-phase system. The resin component is then extracted from the hydrocarbon phase. A small amount of hydrocarbon solvent is utilized to form the two-phase system.

U.S. Pat. No. 4,435,337 relates to a process for isolating rubber, resins, water-solubles and bagasse from comminuted guayule by drying the plant material until it contains a moisture content of from about 5 to about 25 percent by weight, deresinating the plant by utilizing an essentially anhydrous oxygenated organic solvent containing acetone and subsequently recovering rubber, water-solubles and by-products bagasse by water flotation.

The above patents are not pertinent in that they (1) do not utilize a resin-rubber solvent system, (2) do not use water to create a phase separation, (3) do not address the problem of the separation of bagasse solid particles from the resin-rubber miscella, and the like.

DISCLOSURE OF INVENTION

It is therefore an aspect of the present invention to provide a method for separating guayule bagasse from a guayule shrub-solvent system.

It is yet another aspect of the present invention to provide a method for separating guayule bagasse, as above, by utilizing a resin-rubber solvent system typically comprising a polar solvent and a hydrocarbon solvent.

It is yet a further aspect of the present invention, to provide a method for separating guayule bagasse, as above, by simultaneously extracting the rubber-resin and then by adding water to said guayule shrub-solvent mixture to produce a two-phase system wherein said bagasse is located just below the solvent-water interface.

It is yet another aspect of the present invention to provide a method for separating guayule bagasse, as above, wherein the resin-rubber solvent contains an azeotropic mixture of approximately 78 percent pentane and approximately 22 percent acetone by weight.

In general, a method for separating bagasse from a guayule source comprises the steps of: contacting a resin-rubber solvent with the guayule source having the bagasse therein; simultaneously extracting rubber and resin and forming a miscella solution; and adding water to said solution and forming an aqueous phase and a miscella phase whereby said bagasse is separated from said miscella phase.

These and other aspects of the present invention will become apparent from the following detailed specification.

BEST MODE FOR CARRYING OUT THE INVENTION

Guayule plants, according to the present invention and especially when in comminuted form, are subjected to a resin-rubber solvent system. The solvent system contains one or more solvents which extract both the resin as well as the rubber from the guayule shrub. An example of a single-solvent system is tetrahydrofuran. Typically, the solvent system utilizes one or more organic polar solvents as well as one or more hydrocarbon solvents. Although the two types of solvents can form a two-phase system, they often form a single phase system. One manner of adding solvents to the shrub is separately but simultaneously. However, they are generally prepared as a mixture and added.

The guayule shrub utilized in the present invention is initially ground into small particles, for example 1 inch or less and desirably $\frac{1}{2}$ inch or less in size. Generally, the entire plant is fed whole, that is with the leaves thereon as well as dirt or foreign debris, to a grinding apparatus. Usually, any conventional grinding or shredding apparatus such as a hammermill can be utilized. In lieu of the plant being shredded into small particles, for example $\frac{1}{8}$ inch or less, larger particles such as on the order of $\frac{1}{2}$ inch or less can be flaked, that is crushed by adding to a two-roll mill or other conventional equipment which ruptures the rubber-containing cells. The whole guayule shrub can be added containing a normal amount of moisture therein or a low amount of moisture after drying as for example from 0 to about 25 percent by weight. Upon addition of a solvent, the resin of the shredded particles and especially the rubber is extracted therefrom by said solvents. The mixture of the resin, the rubber and the solvents is often called miscella. The dirt, foreign debris as well as the pulp or woody portion of the plant is called the bagasse. Moreover, during shredding, the portion of very small particles of plant material produced is generally referred to as fines and are considered part of the bagasse. Fines are generally very small particles as of 100 microns or less.

When the resin-solvent system utilizes two types of solvents, the amount of organic polar solvent utilized as part of the total solvent system is generally from about 10 percent to about 35 percent by weight and preferably from about 15 percent to about 27 percent by weight. Examples of organic polar solvents include the ketones having from 3 to 8 carbon atoms such as methyl ethyl ketone, acetone and the like. Acetone is a highly preferred solvent. Other organic polar solvents include the esters having from 3 to 8 carbon atoms, such as the formates, acetates, propionates, and the like. Moreover alcohols, having from 1 to 8 carbon atoms such as methanol and ethanol can also be utilized. Another polar solvent is the ethers having from 2 to 8 carbon atoms, such as dimethyl ether, diethyl ether and the like as well as cyclic ethers of from 4 to 8 carbon atoms such as tetrahydrofuran, and the like.

The hydrocarbon solvents, or non-polar solvents, include the alkanes having from 4 to 9 carbon atoms such as pentane, hexane, heptane, and the like, with pentane and hexane being preferred. Cycloalkanes and alkyl cycloalkanes having from 5 to 10 carbon atoms such as cyclohexane can also be utilized. Other hydrocarbon solvents are various aromatics and alkyl substituted aromatics having from 6 to 12 carbon atoms such as benzene, toluene, xylene, and the like.

Accordingly, numerous combinations of an organic polar solvent and a hydrocarbon can exist. Specific examples include cyclohexane, hexane or pentane as the hydrocarbon solvent with methanol methyl ethyl ketone, or acetone as a polar solvent. A specific solvent system of the present invention is an azeotropic composition of approximately 78 percent by weight of pentane, more specifically 78.1 percent by weight of pentane, and 22 percent by weight of acetone, more specifically 21.9 percent by weight. The ratio of solvent by weight to the amount of shredded shrub can be any small amount sufficient to generally extract most of the rubber and resin, as for example from about 1 part by weight up to a large excess of solvent as about 20 parts by weight based upon 1 part by weight of said shrub. A more desirable range is from about 1 part of solvent to about 2.5 parts of solvent per 1 part by weight of shrub. Of course, very large amounts of solvent can be utilized in excess of the above stated ranges but become cost prohibitive.

An essential step of the present invention in order to separate the bagasse and fines in addition to the simultaneous addition of solvent or simultaneous extraction of resin and rubber is the addition of water to the solvent-treated, shredded guayule shrub. The addition of water is not for purposes of deresination or for rubber extraction, but rather to form a two-phase system. That is, the rubber extract, the resin extract and the solvents, i.e., the miscella, forms one phase and the bagasse, including the fines therein, along with any dirt and the added water, forms the second phase. Thus, through the addition of water, the bagasse and any dirt is separated out of the solvent portion phase and into the water portion phase. Generally, the bagasse and any dirt are located just below the miscella-water interface. The water can be added in any conventional manner and is generally thoroughly mixed with the solvent-treated, shredded shrub so that the water contacts the bagasse and fines and, upon settling, separates it from the miscella phase. Upon contact with water, the bagasse and fines tend to swell to approximately double their original volume in miscella. This can improve the ability to use mechanical separators or devices to separate the bagasse and fines from the water phase. Generally, any conventional system or method, or mechanical separator can be utilized to remove the bagasse and fines. For example, filtration, expression, and the like. Although a very small amount of fines still remains in the miscella, a polishing filter downstream of the miscella-water phase separator, or other conventional separator can separate out the small amount of fines.

A further advantage of the present invention is that the water tends to extract acetone from the miscella phase since acetone is soluble in the water phase. This causes an increase in concentration of rubber and resin in the miscella phase and abates the need for later concentration in the process to recover the resin and rubber extracts.

According to the present invention, settling of the water phase is relatively quick and usually a matter of minutes. Moreover, the recovery of the bagasse as well as dirt is quite high and accordingly decreases the loading of the final miscella filter. Thus, a practical process for separation of bagasse and fines has been demonstrated such that it is applicable to commercial processes. Previously, the various different prior art methods had limited commercial feasibility due to the difficulty of separating the resin rubber solution (miscella) from bagasse. This was especially difficult when concentrated miscella was used as the extractant in place of pure solvent. Moreover, the prior art methods necessitated large amounts of wash solvents to recover the extracts from the bagasse, and gravity filtration was slow when viscous products were utilized. Hence, the prior art methods required additional amounts of solvents as well as equipment of increased size and/or energy consumption. According to the present invention, the amount of water added to miscella is from about 50 percent by weight to about 400 percent by weight based upon the weight of the shrub in the solvent. A more desirable range is from about 100 to about 250 percent by weight.

The reference will be better understood by reference to the following examples.

SHRUB SHREDDING AND FLAKING

Whole, fresh guayule shrub was ground to ½ inch nominal size in a Kelly Duplex hammermill equipped with a ½ inch screen. The ground shrub was dried in a forced-air oven at 100° F. to 20–25 percent by weight moisture. Dried shrub was then passed through a differential-speed, two-roll mill set at zero nip. The flaked material was passed through the two-roll mill a second time to ensure maximum cell rupture.

EXAMPLE 1

A one-step rubber-resin extraction was carried out several times until a 5 percent or 10 percent concentrated miscella was obtained. That is, whole guayule shrub which was shredded in a manner as set forth immediately above was added to a vessel. Then an admixture of a solvent set forth below was added and the rubber and resin in the guayule shrub extracted therefrom. The solvent contained approximately 1 or 2 percent by weight of total rubber and resin therein. This solvent was then added to another vessel containing therein freshly shredded guayule prepared in a manner as set forth above. This process was repeated until the solvent contained said 5 or 10 percent concentrated miscella therein. Several experiments were performed in which freshly shredded guayule, prepared in a manner as set forth above, was extracted with the concentrated miscella. Water was added to each of the solutions followed within 3 to 5 minutes by decanting the upper layer. The bagasse was located at the upper portion of the water layer. The solvent system utilized was an azeotropic mixture of 78 weight percent pentane and 22 weight percent acetone. The final solvent composition of the upper layer after phase separation, upon the addition of water, contained from 88 percent pentane to about 95 percent pentane and from 12 percent acetone to 5 percent acetone. Among other items, this example demonstrates that addition of water partially extracts acetone from the miscella, thereby concentrating the miscellas as well as readily forms a two-phase system with the bagasse located in the water phase

EXAMPLE 2

In a manner as set forth above, whole guayule plants were shredded and then tested.

The one-step simultaneous rubber-resin extraction process was employed using 25 g shrub and 63.7 g acetone/pentane azeotrope (78 weight percent pentane and 22 weight percent acetone). After 3 days, 25 cc deionized water was added, 5 cc at a time. At the addition of 10 cc, the bagasse began to swell. After total addition, the system was mixed, the top layer decanted and 10 ml of water was added to the decant. This caused separation into two layers, a clear resin/rubber upper layer and a clear, colorless lower layer. Just below the interface, the bagasse fines were collected. The upper layer was separated and evaporated to recover the small remaining amount of bagasse solids.

This example demonstrates the fact that the small amount of fines still remaining in the miscella layer, after the initial addition of water, can be readily separated by the addition of water to the said miscella layer.

EXAMPLE 3

In a manner similar to Example 1, the following method was carried out.

The one-step simultaneous rubber-resin extraction process was carried out in a bottle containing 25 g shrub and 62.7 g of an acetone/pentane azeotrope. After several days, 64.5 g of deionized water was added and mixed. The bagasse swelled immediately to 1.9 times its original volume, and floated at the top of the water layer, below the miscella. The miscella layer was decanted. GC analysis showed that the solvent was 97.4 percent pentane/2.4 percent acetone, while originally it was 78.1 percent pentane/21.9 percent acetone, by weight. The aceton was extracted into the water-bagasse phase, causing the total solids of the miscella to increase from 4.55 percent to 5.88 percent, a 20 percent increase. Accordingly, the concentration of the resin and rubber in the miscella was increased.

EXAMPLE 4

To 20 g of shredded shrub was added 50 g of pentane-/acetone azeotrope, as above, and extracted for two hours on shaker. Then, 40 g of deionized water was added, agitated, and the upper miscella layer was decanted. The miscella contained 0.2 percent residual fines. The amount of fines varies depending on whether decanting or mechanical methods are used to recover the miscella. However, it is generally small, with the great majority of the bagasse being extracted in the water phase.

While in accordance with the patent statutes the best mode and preferred embodiment has been described in detail, the scope of the invention is not limited thereto, but rather by the scope of the attached claims.

What is claimed is:

1. A method for separating bagasse from a guayule source comprising the steps of:
    contacting a resin-rubber single phase solvent system containing at least one organic polar solvent and at least one hydrocarbon solvent with the guayule source having the bagasse therein,
    the amount of polar organic solvent ranging from about 10 percent to about 35 percent by weight and wherein the amount of said hydrocarbon solvent ranging from about 90 percent to about 65 percent by weight, wherein said polar solvent is selected from the group consisting of a ketone having from 3 to 8 carbon atoms, an ester having from 3 to 8 carbon atoms, an alcohol having from 1 to 8 carbon atoms, and ether having from 2 to 8 carbon atoms and combinations thereof, and wherein said hydrocarbon solvent is selected from the group consisting of an alkane having from 4 to 9 carbon atoms, a cycloalkane or alkyl cycloalkane having from 5 to 10 carbons atoms, an aromatic or alkyl substituted aromatic having from 6 to 12 carbon atoms and combinations thereof;
    simultaeously extracting rubber and resin from said guayule source at an ambient temperature and forming a miscella solution; and
    adding water to said solution and formng an aqueous phase and a miscella phase whereby said bagasse is separated from said miscella phase.

2. A method according to claim 1, wherein the amount of solvent ranges from about 1 part to about 20 parts by weight per part of said guayule source and wherein the amount of water added ranges from about 50 percent to about 400 percent by weight based upon the amount of said guayule source.

3. A method according to claim 2, wherein said guayule source is a guayule particle having a size of generally ½ inch or less.

4. A method according to claim 3, wherein said guayule source has fines therein and said fines are located in said aqueous phase.

5. A method according to claim 2, wherein said guayule source is particles from guayule shrubs.

6. A method according to claim 3, wherein the amount of said polar solvent ranges from about 15 to about 27 percent by weight, wherein the amount of said hydrocarbon solvent ranges from about 85 to about 73 percent by weight, wherein the amount of water added is from about 100 percent by weight to about 250 percent by weight based upon the weight of said guayule particles and wherein the total amount of solvent is from about 1 part to about 2.5 parts by weight per part of said guayule particles.

7. A method according to claim 6, wherein said hydrocarbon solvent is selected from the group consisting of cyclohexane, hexane, and pentane, and wherein said polar solvent is selected from the group consisting of methanol, methyl ethyl ketone, and acetone.

8. A method according to claim 7, wherein said solvent is approximately 78 percent by weight of pentane and approximately 22 percent by weight of acetone.

9. A method according to claim 8, wherein said organic polar solvent is partially absorbed by said aqueous phase.

10. A method according to claim 2, including removing said bagasse containing water phase.

11. A method according to claim 4, including removing said bagasse containing water phase.

12. A method according to claim 6, including removing said bagasse containing water phase.

13. A method according to claim 8, including removing said bagasse containing water phase.

14. A method according to claim 2, including forming a miscella-water interface and collecting said bagasse just below said miscella-water interface.

15. A method according to claim 4, including forming a miscella-water interface and collecting said bagasse just below said miscella-water interface.

16. A method according to claim 6, including forming a miscella-water interface and collecting said bagasse just below said miscella-water interface.

17. A method according to claim 8, including forming a miscella-water interface and collecting said bagasse just below said miscella-water interface.

* * * * *